(12) United States Patent
Goyal et al.

(10) Patent No.: US 12,468,888 B2
(45) Date of Patent: Nov. 11, 2025

(54) AUTOMATIC FACT EXTRACTION

(71) Applicant: Schlumberger Technology Corporation, Sugar Land, TX (US)

(72) Inventors: Akhilesh Goyal, Pune (IN); Michael Antony Cleminson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1191 days.

(21) Appl. No.: 17/250,986

(22) PCT Filed: Oct. 4, 2019

(86) PCT No.: PCT/US2019/054725
§ 371 (c)(1),
(2) Date: Apr. 7, 2021

(87) PCT Pub. No.: WO2020/076635
PCT Pub. Date: Apr. 16, 2020

(65) Prior Publication Data
US 2021/0383249 A1   Dec. 9, 2021

(30) Foreign Application Priority Data
Oct. 8, 2018   (IN) .............................. 201821038164

(51) Int. Cl.
*G06N 5/02* (2023.01)
*G06F 40/284* (2020.01)
(Continued)

(52) U.S. Cl.
CPC .......... *G06F 40/284* (2020.01); *G06N 5/025* (2013.01); *G06V 10/768* (2022.01);
(Continued)

(58) Field of Classification Search
CPC ...... G16H 50/70; G06F 16/288; G06F 40/284
See application file for complete search history.

(56) References Cited

U.S. PATENT DOCUMENTS 9,189,514 B1   11/2015   Myslinski
10,002,129 B1   6/2018   D'Souza
(Continued)

FOREIGN PATENT DOCUMENTS

| JP | 2012510654 A | 5/2012 |
| JP | 2015035015 A | 2/2015 |
| KR | 1020160030809 A | 3/2016 |

OTHER PUBLICATIONS

International Preliminary Report on Patentability of International Patent Application No. PCT/US2019/054725 dated Apr. 22, 2021, 6 pages.
(Continued)

*Primary Examiner* — Lam S Nguyen
(74) *Attorney, Agent, or Firm* — Jeffrey D. Frantz

(57) ABSTRACT

Automatic fact extraction that involves tokenizing text in unstructured information to generate a token list. Parent entity rules defined for a selected domain are applied to the token list to identify a parent entity. Related entity rules that are defined for a related entity linked to the parent entity are applied to the token list to identify the related entity. The related entity is added as an extracted fact of the parent entity to a fact list. The extracted fact is transmitted as structured information to a repository.

20 Claims, 9 Drawing Sheets

(51) Int. Cl.
  *G06N 5/025*     (2023.01)
  *G06V 10/70*     (2022.01)
  *G06V 30/148*    (2022.01)
  *G06V 30/262*    (2022.01)
  *G06V 30/40*     (2022.01)

(52) U.S. Cl.
  CPC .......... *G06V 30/153* (2022.01); *G06V 30/268* (2022.01); *G06V 30/40* (2022.01)

(56) References Cited

U.S. PATENT DOCUMENTS

| | | | |
|---|---|---|---|
| 2009/0019032 A1* | 1/2009 | Bundschus | G16H 50/70 707/999.005 |
| 2016/0239500 A1 | 8/2016 | Dave et al. | |
| 2018/0181646 A1* | 6/2018 | Balasa | G06F 16/288 |

OTHER PUBLICATIONS

Manning, Christopher D., Mihai Surdeanu, John Bauer, Jenny Finkel, Steven J. Bethard, and David McClosky. 2014. The Stanford CoreNLP Natural Language Processing Toolkit in Proceedings of the 52nd Annual Meeting of the Association for Computational Linguistics: System Demonstrations, pp. 55-60.

Toutanova, K., D. Klein, C. Manning, and Y. Singer, 2003, Feature-Rich Part-of-Speech Tagging with a Cyclic Dependency Network: Proceedings of HLT-NAACL 2003, 252-259.

International Search Report and Written Opinion for the equivalent PCT-US2019-054725 emailed on Feb. 5, 2020.

First Examination Report issued in India Patent Application No. 201821038164 dated Dec. 19, 2022, 7 pages.

* cited by examiner

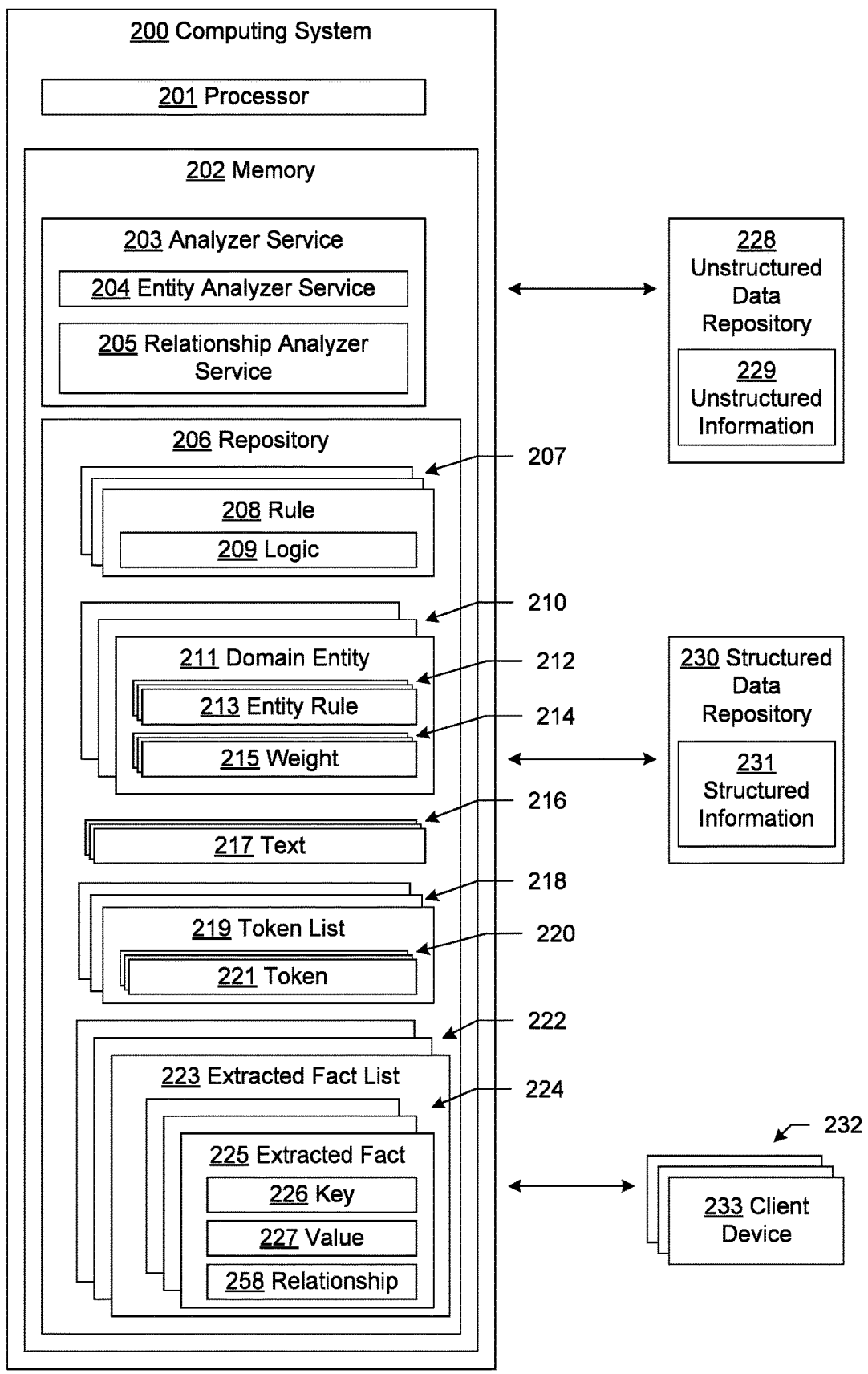
FIG.2.1

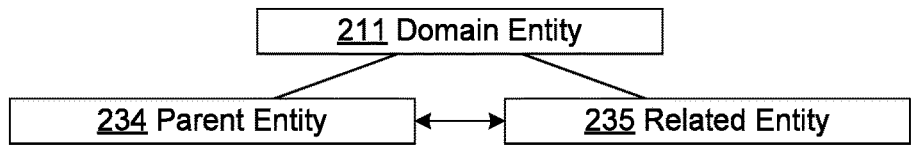
FIG.2.2
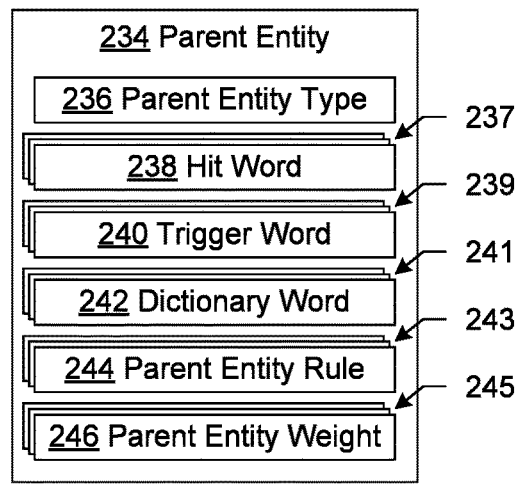
FIG.2.3
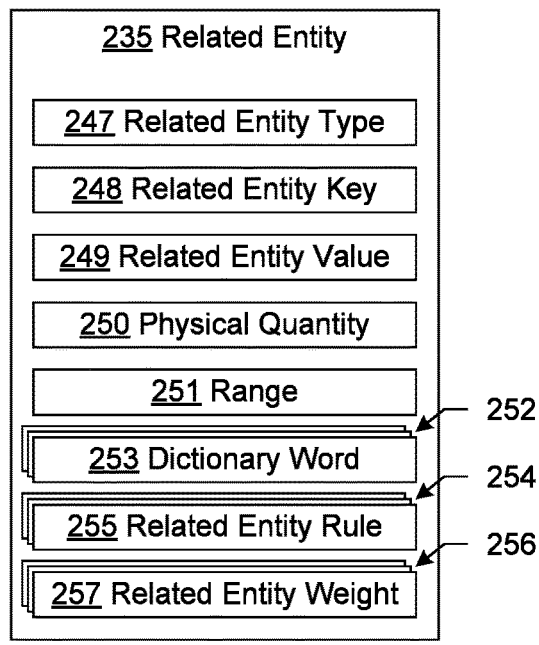
FIG.2.4

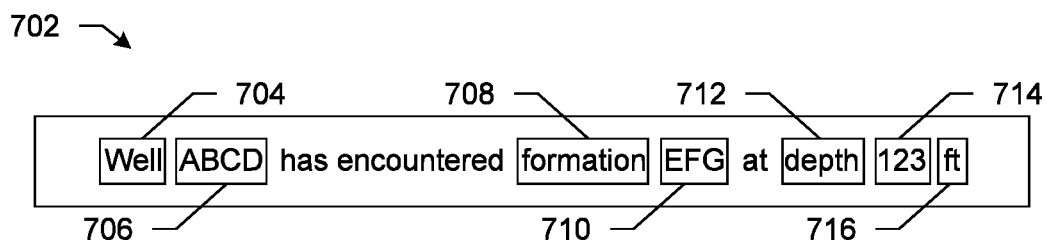
FIG. 7.1
FIG. 7.2

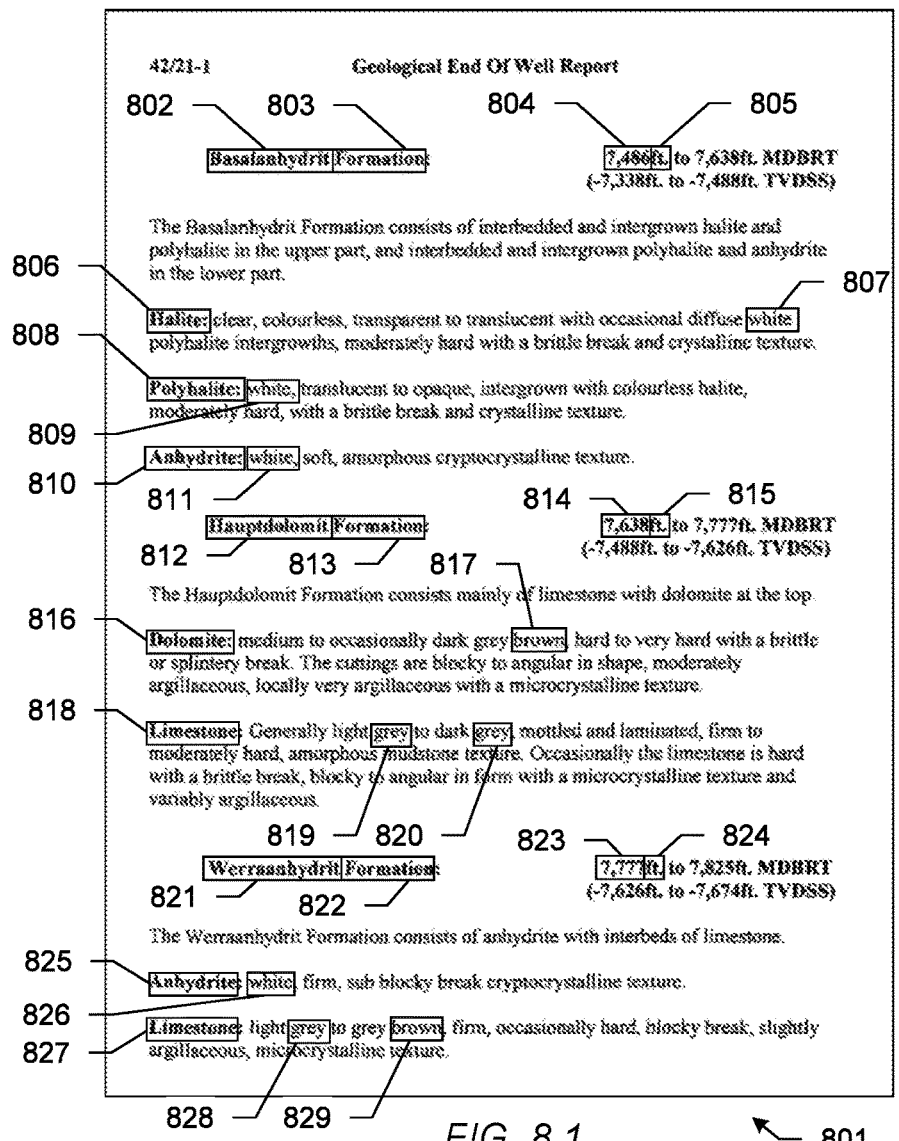
FIG. 8.1
| 854 | Formation Header | | | | | | | |
|---|---|---|---|---|---|---|---|---|
| 856 | Name | Score Name | Depth | Depth Unit | Score Depth | Colors | Score Color | Rock Type | Score Rock Type |
| 858 | Basalanhydrit | 0.67 | 7,486 | ft. | 0.75 | white | 0.8 | halite, polyhalite, anhydrite | 0.8 |
| 860 | Hauptdolomit | 0.67 | 7,638 | ft. | 0.75 | grey, brown | 0.8 | limestone, dolomite | 0.8 |
| 862 | Werraanhydrit | 0.67 | 7,777 | ft. | 0.75 | white, grey, brown | 0.8 | limestone, anhydrite | 0.8 |
| | 864 | 866 | 868 | 870 | 872 | 874 | 876 | 878 | 880 |
FIG. 8.2

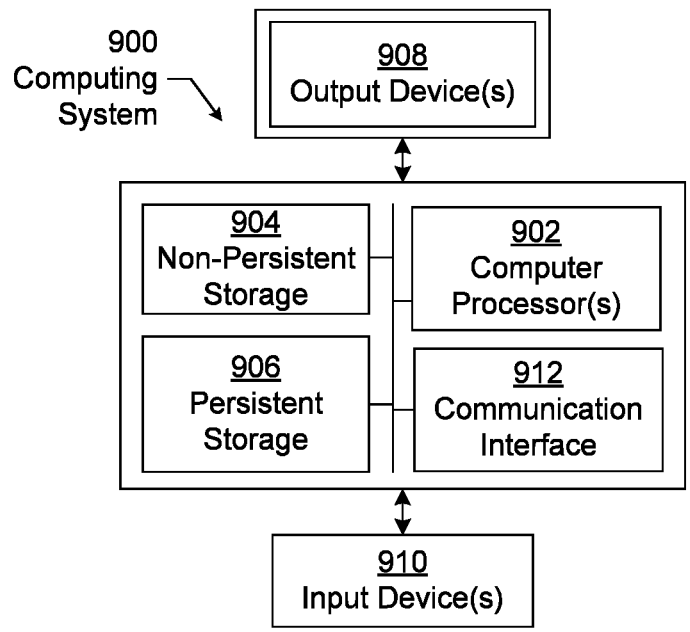
FIG. 9.1
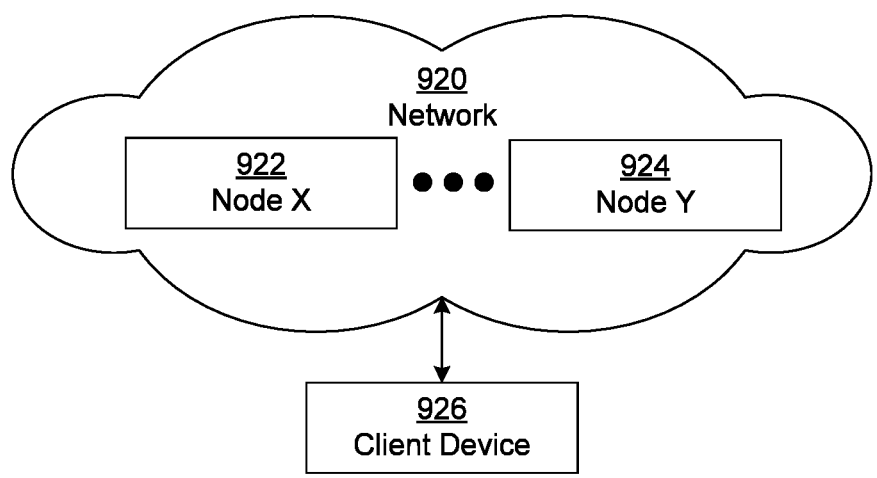
FIG. 9.2

AUTOMATIC FACT EXTRACTION

CROSS REFERENCE PARAGRAPH

This application is a National Stage Entry of International Application No. PCT/US2019/054725, filed Oct. 4, 2019, which claims the benefit of India application No. 201821038164, entitled "AUTOMATIC FACT EXTRACTION," filed Oct. 8, 2018, the disclosure of which is hereby incorporated herein by reference.

BACKGROUND

Document, reports, and images contain a wealth of text information. While humans are able to take complex documents and derive meaning, computers are unable to process documents in the same manner. In other words, a challenge exists in enabling a computer to extract facts from the text, especially text written in a natural language because different words can have the same or different meaning and different documents can have the information in sentences and paragraphs that are organized in a different order. A challenge is to enable a computer to extract facts and generate structured information from the text within unstructured information.

SUMMARY

In general, in one or more aspects, the disclosure relates to automatic fact extraction. Text is tokenized in unstructured information to generate a token list. Parent entity rules defined for a selected domain are applied to the token list to identify a parent entity. Related entity rules that are defined for a related entity linked to the parent entity are applied to the token list to identify the related entity. The related entity is added as an extracted fact of the parent entity to a fact list. The extracted fact is transmitted as structured information to a repository.

Other aspects of the disclosure will be apparent from the following description and the appended claims.

BRIEF DESCRIPTION OF DRAWINGS

FIGS. 2.1, 2.2, 2.3 and 2.4 show diagrams of a system in accordance with disclosed embodiments.

FIGS. 7.1 and 7.2 show an example in accordance with disclosed embodiments.

FIGS. 8.1 and 8.2 show an example in accordance with disclosed embodiments.

FIGS. 9.1 and 9.2 show computing systems in accordance with disclosed embodiments.

DETAILED DESCRIPTION

Figure 1:
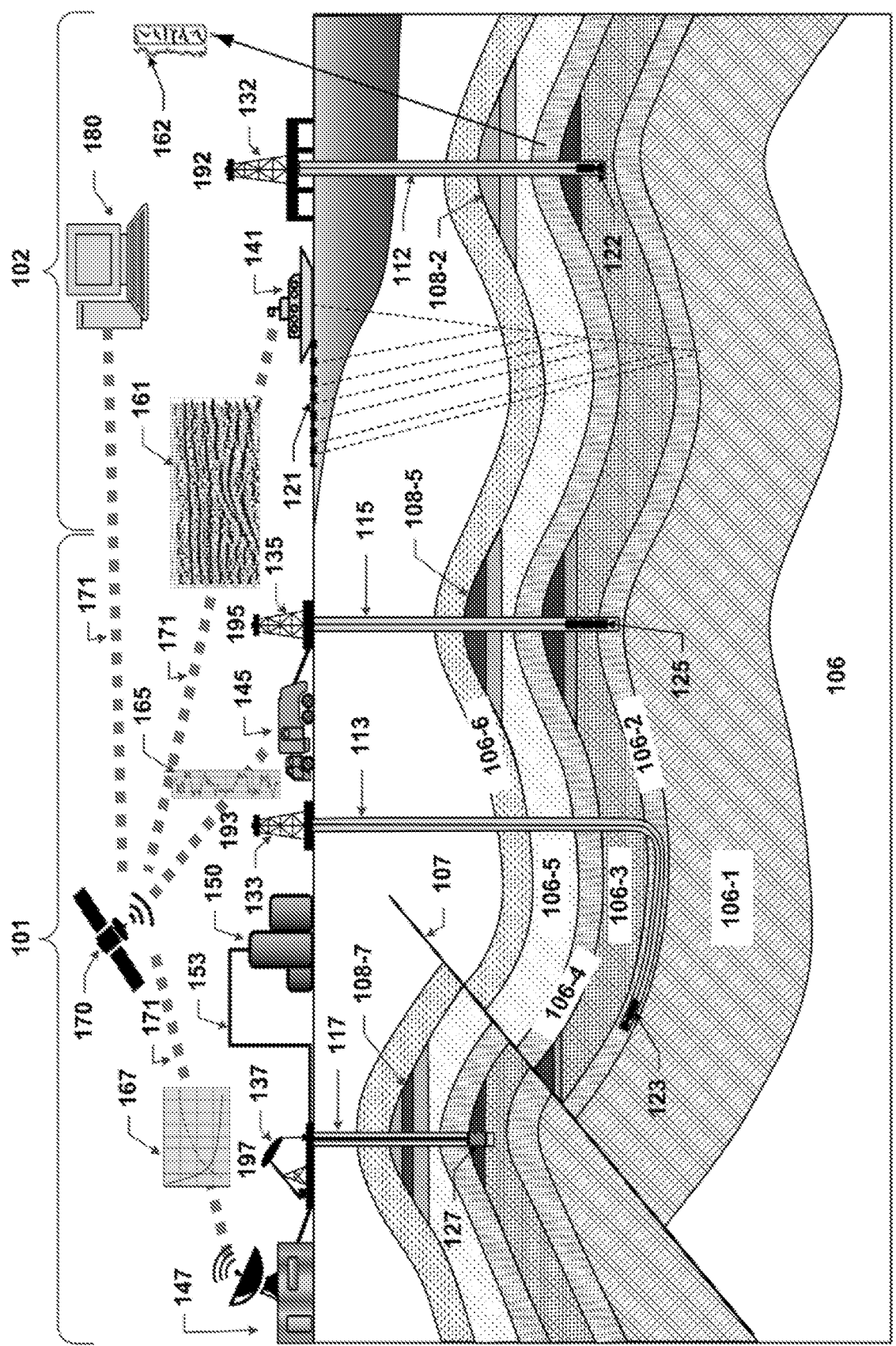
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to an automated fact extraction system. In one or more embodiments, the automated fact extraction system is designed to extract different information types which are commonly found in exploration and production (E&P) reports, for example well header information, layer descriptions, drilling tool information, and drilling parameters. The system can be trained to extract any specified data types and can be extended to extract any type of E&P domain information. The input to the system is unstructured information in the form of text from the reports and documents. The system utilizes domain knowledge related to the facts targeted for extraction in the form of rules. Using the system, a workflow can be designed involving preprocessing, extraction, and post-processing to efficiently utilize the extracted facts in various domains.

The system utilizes natural language processing with domain percipience. The system is designed to receive various domain facts and knowledge in the form of a plurality of rules that identify domain entities. With the rules, the system can recognize various facts and validate the information being extracted. The system can use various dictionaries, word lists, ranges, and logic to automate the fact extraction from the text.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 9.1 and 9.2 and described below.

FIG. 2.1 shows a computing system (200), which may be the same as the computing system (180) in FIG. 1. The hardware components of the computing system (200) is described in further detail below and in FIGS. 9.1 and 9.2. The computing system (200) includes a processor (201), and a memory (202), which are described below. The computing system (200) communicates with the unstructured data repository (228), the structured data repository (230) and the client devices (233), which are described below.

In one or more embodiments of the technology, the repositories (206), (228), and (230) are any type of storage unit and/or device (e.g., a file system, database, collection of tables, physical memory, or any other storage mechanism) for storing data. The storage of data may be permanent, semi-permanent, or temporary (e.g., during execution of the analyzer service (203)). Further, the repositories (206), (228), and (230) may include multiple different storage units and/or devices. The multiple different storage units and/or devices may or may not be of the same type or located at the same physical site.

The processor (201) is a unit of processing power that executes instructions stored in the memory (202). In one or more embodiments, the processor (201) includes one or more virtual processors executing on one or more electronic circuits of one or more computers and can include multiple central processing units, graphical processing units, digital signal processors, etc.

The memory (202) stores data and instructions that are used by the processor (201) to execute one or more programs on the computing system (200). In one or more embodiments, the memory (202) includes the virtual memory of one or more virtual machines executing on one or more physical machine instances that include one or more computer readable storage mediums. The memory (202) includes the analyzer service (203) and the repository (206), which are described below.

The analyzer service (203) is a collection of one or more programs or software routines that are executed by the processor (201) to process the unstructured information (229) from the unstructured data repository (228) and generate the structured information (231) of the structured data repository (230). In one or more embodiments, the analyzer service (203) includes the entity analyzer service (204) and the relationship analyzer service (205), which are described below. In one or more embodiments, the analyzer service (203) generates the unstructured information (229) from reports, log-scans, and images from an oilfield using optical character recognition and generates the tokenized list (219) from the text (217) from the unstructured information (229). Additionally, the unstructured information can be extract as text directly from reports that are persisted as certain types of files, including text files, hyper text markup language (HTML) files, extensible markup language (XML) files, Microsoft Office files (which include Word documents, PowerPoint presentations, and Excel spreadsheets), etc.

The entity analyzer service (204) is a collection of programs that are executed by the processor (201) to identify entities within the text (217). As discussed further below, the entities include the domain entities (210), parent entities (234), and related entities (235).

The relationship analyzer service (205) is a collection of programs that are executed by the processor (201) to identify relationships between the entities identified within the text of the unstructured information (229). In one or more embodiments, the relationship analyzer service (205) uses natural language processing to identify the relationships between the entities.

The repository (206) stores the data for the analyzer service (203). The repository (206) includes the rules (207), the domain entities (210), the group of text (216), the token lists (218), and the extracted fact lists (222), which are described below.

The rule (208) is one of the rules (207) in the repository (206). In one or more embodiments, the rule (208) is applied to the text (217) by the analyzer service (203) to determine whether the text (217) passes the rule (208). In one or more embodiments, the rule (208) uses a binary output to indicate whether the text (217) passed the rule (208).

The logic (209) of the rule (208) determines whether the text (217) passes the rule (208). In one or more embodiments, the logic (209) is a logical statement that is evaluated by the analyzer service (203) using the text (217). In one or more embodiments, the logic (209) involves comparing the text (217) to one or more word lists, ranges, values, and expressions, as described below.

The domain entity (211) is one of the domain entities (210). The domain entity (211) includes the entity rules (212) and the weights (214). In one or more embodiments, the entity rules (212) have a one-to-one relationship to the weights (214). In one or more embodiments, the domain entities (210) correspond to real world physical objects that are mentioned in the unstructured information (231). Individual domain entities can be either a parent entity or a related entity, which are further described below with respect to FIGS. 2.2, 2.3, and 2.4. The parent entities identify specific instances of a real-world physical object. The related entities identify the attributes, properties, and characteristics of the real-world physical objects identified by parent entities.

In some embodiments, the physical object represented by the related entity may also be represented by a parent entity. By way of an example, the parent entity may be a well. A related entity may be a formation that passes through the well. Continuing with the same example, the parent entity may be the formation and the related entity may be the well that passes through the formation. In such embodiments, the identification of the parent entity is based on the target physical object for analysis.

The entity rule (213) is one of the entity rules (212) for the domain entity (211). In one or more embodiments, the entity rule (213) is one of the rules (207), and can be used by different domain entities (210).

The weight (215) is one of the weights (214) for the domain entity (211). In one or more embodiments, the weights (214) are combined with the rules (207) to generate a salience score for the domain entity (211) by the analyzer service (203), as described further below.

The text (217) is part of the group of text (216) that is pulled from the unstructured information (229). In one or more embodiments, the text (217) are a collection of computer encoded characters, such as a sequence of ASCII or Unicode characters. In one or more embodiments, the text (217) is a portion of at least some of a document that includes a phrase, sentence, paragraph, page, section, etc., from the unstructured information (229). The unstructured information (229) and text (217) is the target of the analysis. The group of text (216) is the corpus of text that is analyzed by the analyzer service (203) and includes the files and documents from the unstructured information.

The token list (219) is one of the token lists (218) in the repository (206). In one or more embodiments, the token lists (218) correspond one-to-one to the groups of text (216). For example, the token list (219) corresponds to the text (217). The token list (219) is a list of the tokens (220).

The token (221) is one of the tokens (220) in the token list (219). In one or more embodiments, the token (221) is a word from the text (217).

The extracted fact list (223) is one of the extracted fact lists (222) in the repository (206). The extracted fact list (223) is generated by the analyzer service (203) from the text (217), the token list (219), and the token (221) to form part of the structured information (231), the extracted fact list (223), and the extracted facts (224).

The extracted fact (225) is one of the extracted facts (224) in the extracted fact list (223). The extracted fact (225) includes the key (226), the value (227), and the relationship (258). The key (226) identifies a name of the extracted fact, the value (227) identifies the value of the extracted fact (225), and the relationship (258) identifies the relationship between the extracted fact (225) and another one of the extracted facts (224). The relationship (258) can be hierarchical to identify a parent or child of the extracted fact (225). For example, the extracted fact (225) can be information stored in a database where the key (226) identifies a field of a record in the database, the value (227) is the value for the field in the record of the database, and the relationship (258) is embodied as the collection of fields in the record. The extracted facts (224) are generated from the unstructured information (229) by first limiting a scope of the facts that are to be extracted to a particular domain, then identifying parent entities in the domain, and then further narrowing the scope of the facts to certain properties, attributes, and characteristics using related entities of the parent entities.

The unstructured data repository (228) stores the unstructured information (229). In one or more embodiments, the unstructured information (229) includes information from reports, log-scans, and images from an oilfield that is stored in an unstructured manner. As an example, the unstructured data repository (228) can be a plain text database of text files with the information from the reports, log-scans, and images.

The structured data repository (230) stores the structured information (231). In one or more embodiments, the structured information (231) includes the extracted fact lists (222). As an example, the structured data repository (230) can be a database with tables, rows, and columns based on the keys, values, and relationships of the extracted facts from the extracted fact lists (222).

The client device (233) is one of the client devices (232). The client devices (232) communicate with the computing system (200) to engage and operate the analyzer service (203) and to display the unstructured information (229) and the structured information (231). The client devices (232) can display the data from the repository (206) and the progress of the analyzer service (203).

Turning to FIG. 2.2, the domain entity (211) can be a parent entity (234) or a related entity (235). The parent entity (234) can be the parent to multiple related entities. The related entity (235) has a single parent entity (234). Thus, a hierarchical relationship exists between parent entity and related entity.

Turning to FIG. 2.3, the parent entity (234) is a type of domain entity. In one or more embodiments, the parent entity (234) is a parent of one or more related entities within the domain entities (210), including the related entity (235). In one or more embodiments, the parent entity (234) includes the parent entity type (236), the hit words (237), the trigger words (239), the dictionary words (241), the parent entity rules (243), and the parent entity weights (245).

The parent entity type (236) identifies the type of the parent entity (234). In one or more embodiments, the type of a parent entity identifies what the real-world physical object is that corresponds with the parent entity. For example, in the oilfield domain, parent entity types include well, field, formation, drilling tool, etc., as described in FIG. 1.

The hit word (238) is one of the list of hit words (237). The hit word (238) is a word that directly identifies the type of the parent entity. In other words, the hit words (237) unambiguously identify the type of a parent entity. For example, when the parent entity is a well, the hit words (237) can include "well", "well name", "borehole", etc.

The trigger words (239) include the trigger word (240). The trigger word (240) indicates the type of the parent entity of a token being analyzed when the trigger word (240) is present in a token that is near the token being analyzed. Specifically, having a trigger word within a threshold distance to the token being analyzed is indicative that the token is of the parent entity type. A trigger word (240) is near the token being analyzed when the trigger word is present in a token within a threshold number of tokens before or after the token being analyzed. For example, when the threshold number is three, a trigger word can identify the parent entity type when the trigger word is present as one of the three tokens before the token being analyzed or is present as one of the three tokens after the token being analyzed. When the parent entity (234) is a well, the trigger words (239) can include "wildcat", "drilled", "exploration", "production", etc.;

The dictionary words (241) form a dictionary list that includes the dictionary word (242). The dictionary words (241) are known names of the parent entity (234). Specifically, a dictionary word (241) is a unique identifier of a specific entity. For example, when the parent entity (234) is a specific formation, the corresponding dictionary word (242) is the name of the formation, such as, e.g., "basalanhydrit", "hauptdolomit", or "werraanhydrit".

The parent entity rules (243) include the parent entity rule (244). The parent entity rules (243) are the rules (207) that are used by the analyzer service (203) to identify the parent entity (234). The parent entity rules (243) can use the hit words (237), the trigger words (239), and the dictionary words (241). For example, a first parent entity rule can include logic to compare a token being analyzed to the hit words (237) and output a true value when the token being analyzed is a word found in the hit words (237) and otherwise output a false value. A second parent entity rule can include logic to compare the words surrounding the token being analyzed to the trigger words (239) and output a true value when there is a match and output a false value when there is no match or a mismatch. A third parent entity rule can include logic to compare the token being analyzed to the dictionary words (241) and output a true value when there is a match and a false value when there is no match.

The parent entity weights (245) include the parent entity weight (246). The parent entity weights (245) have a one-to-one relationship to the parent entity rules (243). In one or more embodiments, the parent entity weight identifies a probability that if the corresponding parent entity rule is satisfied, the entity is of the parent entity type identified by the parent entity rule. The parent entity weights (245) are used by the analyzer service (203) to weight the outputs of the parent entity rules (243) in determining a salience score for the parent entity (234) for a token being analyzed, as described further below.

Turning to FIG. 2.4, the related entity (235) is a type of domain entity. In one or more embodiments, the related entity (235) is a child of the parent entity (234) that includes information related to the parent entity (234). For example, when the parent entity (234) is a rock formation of a well, the related entity (235) can be one of the properties, attributes, and characteristics that describe the rock formation, such as, the colors of the rock formation, the types of rock within the rock formation, the name of the rock formation, etc. In one or more embodiments, the related entity (235) is matched by the analyzer service to the tokens (220) of the token list (219) from the text (217). In one or more embodiments, the related entity (235) includes the related entity type (247), the related entity key (248), the related entity value (249), the physical quantity (250), the range (251), the dictionary words (252), the related entity rules (254), and the related entity weights (256).

The related entity type (247) indicates the type of the related entity (235). In one or more embodiments, the related entity type (247) indicates that the related entity (235) is one of a string, a number, a date, etc.

The related entity key (248) is an identifier for the related entity value (249). For example, when the token being analyzed is the name of a formation, the related entity key (248) can be "name". As another example, when the token being analyzed is a depth of a formation, the related entity key (248) can be "depth". In one or more embodiments, the related entity key (248) of the related entity (235) can be converted into the name of a column of a database within the structured information (231).

The related entity value (249) is the value of the related entity (235) for the related entity key (248) that is identified from one or more tokens (220). The related entity value (249) can be a string, a number, a date, etc. For example, when the token being analyzed is "basalanhydrit" and "basalanhydrit" is determined to be the name of a formation, the related entity value (249) is "basalanhydrit". As another example, when the token being analyzed is a depth of a formation, the related entity value (249) can be "7,486".

The physical quantity (250) identifies the units of the related entity (235). For example, when the related entity (235) is a length, the physical quantity (250) can specify that the length is in feet, meters, kilometers, etc. When the related entity (235) is a time, the physical quantity (250) can identify that the units of time for the related entity value (249) are in seconds, minutes, days, etc.

The range (251) identifies acceptable values for the related entity value (249). The range (251) specifies a bound on the related entity, whereby when a value of a token is outside of the range, the token has a low probability of referencing the related entity. For example, when the related entity (235) is a formation, the range (251) can specify a minimum depth and a maximum depth for the formation that can be used by one of the related entity rules (254) to determine whether a token being analyzed includes a depth of the formation. Thus, for example, if the range specifies a maximum depth of a well as 6.8 miles and the token being analyzed has a value of 8 miles, then the token is determined to not represent the depth of the well.

The dictionary words (252) form a list that includes the dictionary word (253). The list of dictionary words (252) of the related entity (235) include words that are known to be associated with the related entity (235). For example, the word (253) can be "depth", which can identify a token as part of a related entity that is a depth of a formation.

The related entity rules (254) include the related entity rule (255). The related entity rules (254) are the rules (208) that are used by the analyzer service (203) to identify the related entity (235). The related entity rules (254) can use the range (251) and the dictionary words (252) to identify the related entity (235). For example, a first related entity rule can compare the token being analyzed to the range (251) to determine whether a number in the token being analyzed is within the range (251) and output a true value, or otherwise output a false value. As another example, a second related entity rule can compare the token being analyzed to the dictionary words (252) to determine whether the token being analyzed matches a word in the dictionary words (252) and output a true value, or otherwise output a false value.

The related entity weights (256) include the related entity weight (257). The related entity weights (256) have a one-to-one relationship to the related entity rules (255). The related entity weights (257) are used by the analyzer service (203) to weight the outputs of the related entity rules (254) in determining a salience score for the related entity (235) for a token being analyzed, as described further below.

FIG. 3, FIG. 4, FIG. 5, and FIG. 6 show flowcharts in accordance with one or more embodiments of the disclosure. While the various steps in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

Figure 3:
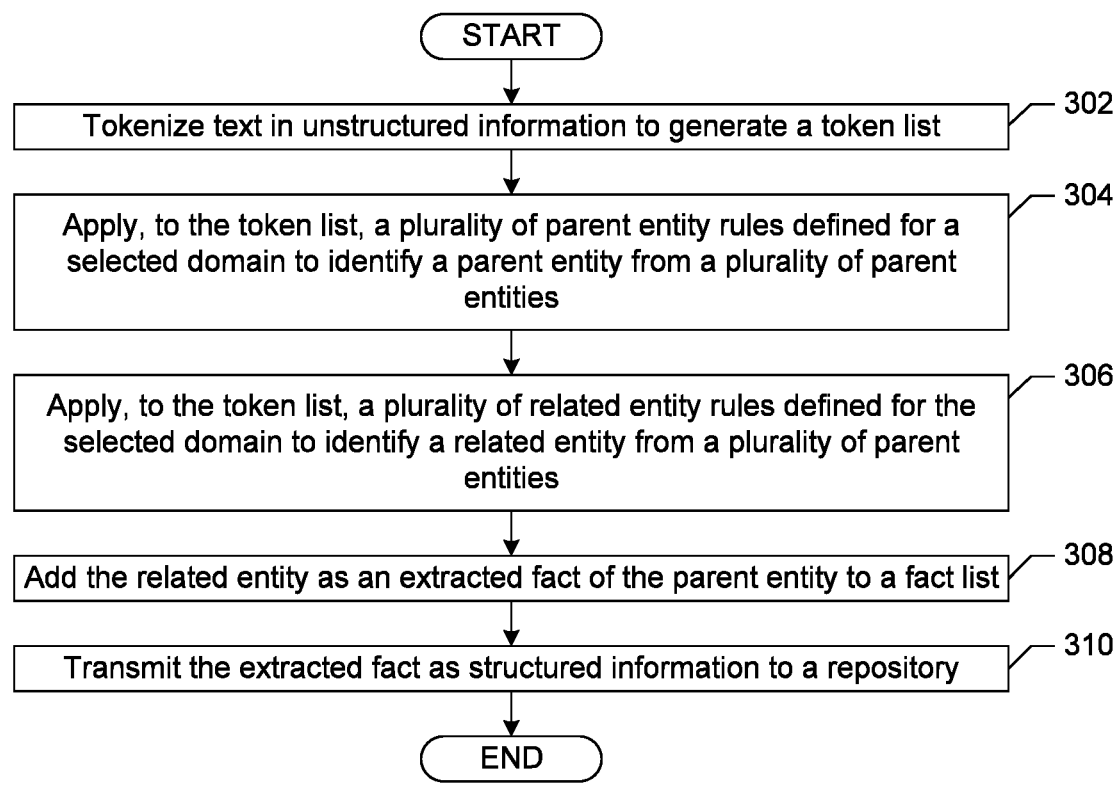
FIGS. 3, 4, 5, and 6 show flowcharts in accordance with disclosed embodiments.

Turning to FIG. 3, FIG. 3 shows a flowchart in accordance with one or more embodiments of the disclosure. In Block 302, text in unstructured information is tokenized to generate a token list. In one or more embodiments, the analyzer service takes a string of text from the unstructured information stored in an unstructured data repository and splits the text into a list of words using the white space and punctuation between the words. The words from the text form the tokens in the token list. Additional embodiments can use word stemming to reduce the number of possible words in the token list.

In Block 304, parent entity rules are applied to the token list. The parent entity rules are defined for a parent entity of a selected domain to identify the parent entity from multiple parent entities. In one or more embodiments, the entity analyzer service processes the tokens in the token list against the parent entity rules of the parent entities of the selected domain. For example, the parent entity rules can include a first rule that compares a token being analyzed to a list of hit words, a second rule that compares the tokens surrounding the token being analyzed to a list of trigger words, and a third rule that compares the token being analyzed to a list of dictionary words of the parent entity.

In Block 306, related entity rules are applied to the token list. The related entity rules are defined for a related entity that is linked to a parent entity of the selected domain. In one or more embodiments, related entity rules are obtained by identifying the parent entities of the selected domain, identifying the related entities of the parent entities, and retrieving the related entity rules from the related entities of the parent entities of the selected domain from a repository. In one or more embodiments, the entity analyzer service processes the tokens in the token list against the related entity rules of the related entities of the parent entities of the selected domain to identify a related entity that corresponds to the token being analyzed. For example, the related entity rules can include a first rule that specifies the type of the related entity (e.g., string, number, date, etc.), a second related entity rule that identifies the name of a key for the related entity, a third rule that identifies a value of the related entity, a fourth rule that determines whether the value of the related entity is within a range of the related entity, and a fifth rule that compares the token being analyzed to a list of dictionary words of the related entity.

In Block 308, the related entity is added as an extracted fact to a fact list. In one or more embodiments, the analyzer service generates the fact list, which is a list that includes information from the parent entities and the related entities that were identified by applying the parent entity rules and the related entity rules to the token list.

In Block 310, the extracted fact is transmitted. In one or more embodiments, the extracted fact is transmitted as structured information to a repository. In one or more embodiments, the extracted fact is converted to structured information by converting the fact list to a set of database records that are transmitted to and stored in a database within the structured data repository. In one or more embodiments, the extracted fact is transmitted to the client device (233). The client device (233) displays any of the keys, values, and relationships of the extracted facts received by the client device (233) with a graphical user interface.

Figure 4:
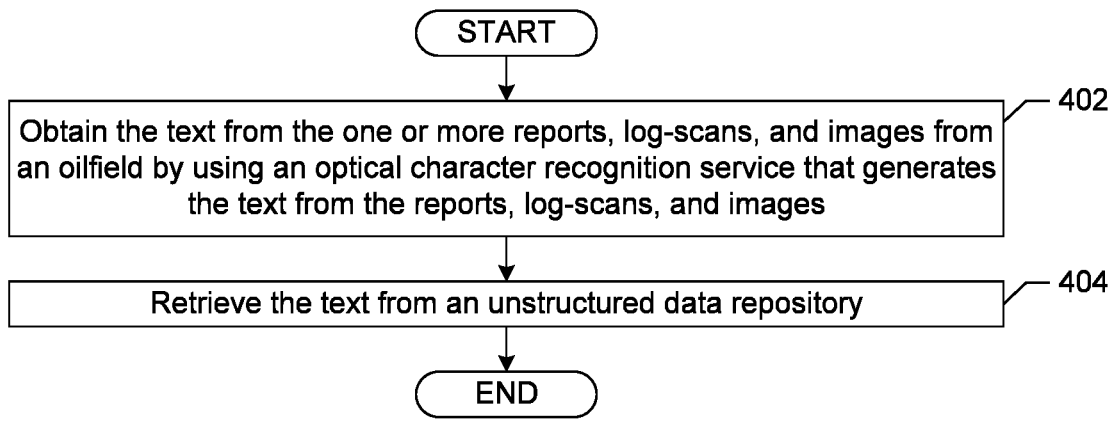

Turning to FIG. 4, FIG. 4 shows a flowchart in accordance with one or more embodiments of the disclosure. The blocks of FIG. 4 can be performed before the Block 302 of FIG. 3. In Block 402, text is obtained. In one or more embodiments, the text is obtained after using an optical character recognition service on one or more reports, log-scans, and images from an oil field that are stored as unstructured data. The output from the optical character recognition service can include text files that are stored in a file system or database.

In Block 404, the text is retrieved from the unstructured data repository. In one or more embodiments, the retrieved text can be a portion of one or more text files that corresponds to one or more sentences, paragraphs, pages, and sections of the reports.

Figure 5:
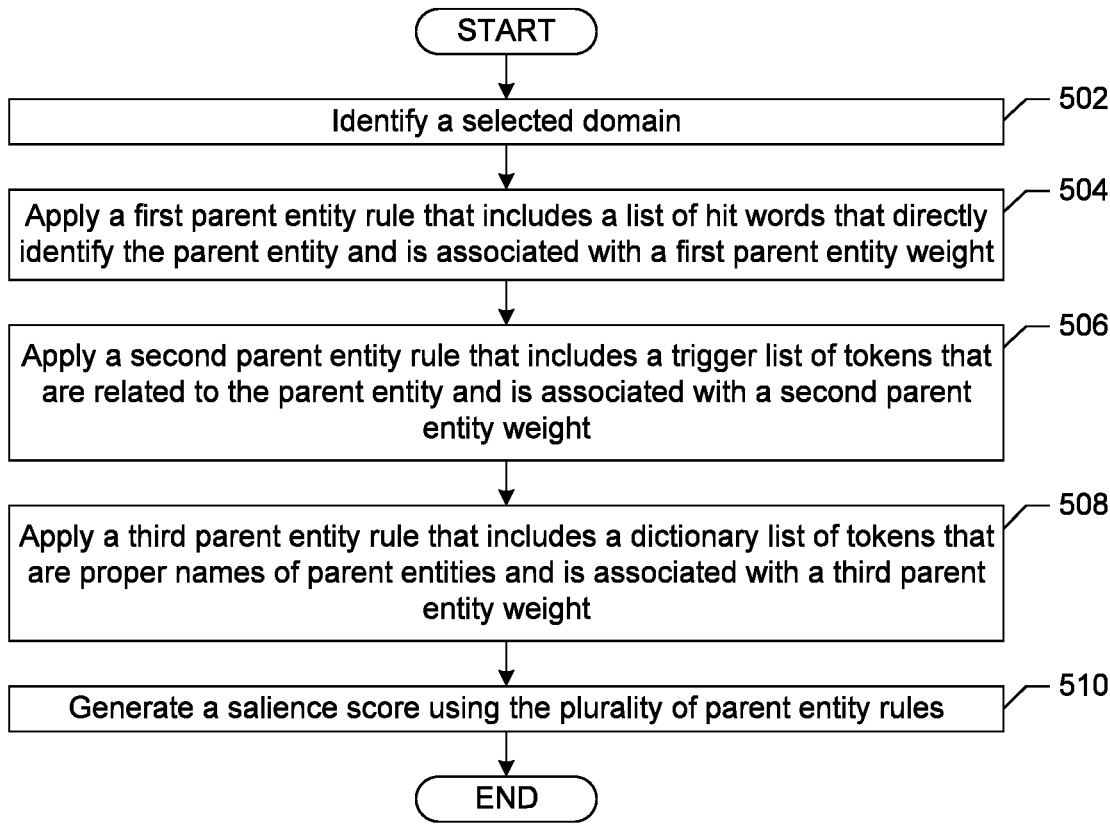

Turning to FIG. 5, FIG. 5 shows a flowchart in accordance with one or more embodiments of the disclosure. In one or more embodiments, the blocks of FIG. 5 can be performed as part of Block 304 of FIG. 3. In Block 502, a selected domain is identified. In one or more embodiments, the domain is selected with a client device that provides the selection to the analyzer service. In one or more embodiments, the selected domain is for oilfield services, which includes parent entities for well, formation, rig, etc. After the selected domain is identified, the parent entities that correspond to the selected domain are identified. After identifying the parent entities, the related entities that correspond to the parent entities are identified. Additional domains, parent entities, and related entities can be created with the client device and used by the analyzer service. Different domains can use the same parent entities and different parent entities can use the same related entities.

In Block 504, a first parent entity rule is applied. In one or more embodiments, the first parent entity rule includes a list of hit words that directly identify the parent entity. The first parent entity rule is associated with a first parent entity weight. The first parent entity weight can be applied to the output of the first parent entity rule after application of the first parent entity rule to a token of the token list. In one or more embodiments, the first parent entity rule is applied by comparing tokens in the token list to the hit words and outputting a true value for the tokens that match the hit words and outputting a false value when there is no match, i.e., a mismatch.

In Block 506, a second parent entity rule is applied. In one or more embodiments, the second parent entity rule includes a list of trigger words that indirectly identify the parent entity. The second parent entity rule is associated with a second parent entity weight. The second parent entity weight can be applied to the output of the second parent entity rule after application of the second parent entity rule to a token of the token list. In one or more embodiments, the second parent entity rule is applied by comparing tokens in the token list to the hit words and outputting a true value for the tokens that match the hit words and outputting a false value when there is no match, i.e., a mismatch. With the trigger words, the comparison is performed on the tokens surrounding the token being analyzed within a threshold number of tokens, e.g., the four tokens after the token being analyzed and the four tokens preceding the token being analyzed.

In Block 508, a third parent entity rule is applied. In one or more embodiments, the third parent entity rule includes a list of dictionary words that name the parent entity. The third parent entity rule is associated with a third parent entity weight. The third parent entity weight can be applied to the output of the third parent entity rule after application of the third parent entity rule to a token of the token list. In one or more embodiments, the third parent entity rule is applied by comparing tokens in the token list to the dictionary words and outputting a true value for the tokens that match the dictionary words and outputting a false value when there is no match, i.e., a mismatch.

In Block 510, a salience score is generated. The salience score is generated by the analyzer service using the outputs from the plurality of parent entity rules for a parent entity. In one or more embodiments, the salience score is generated using Equation 1 below.

$$\text{Salience Score} = \frac{\text{Sum of Passed Rule Weights}}{\text{Sum of Total Rule Weights}} \quad \text{(Eq. 1)}$$

For example, a parent entity can have 10 rules that are weighted and analyzed as indicated in Table 1 below.

TABLE 1

| Rule | Weight | Pass | Output |
|---|---|---|---|
| Rule 1 | 1 | True | 1 |
| Rule 2 | 1 | True | 1 |
| Rule 3 | 2 | False | 0 |
| Rule 4 | 1 | True | 1 |
| Rule 5 | 3 | True | 3 |
| Rule 6 | 1 | True | 1 |
| Rule 7 | 1 | True | 1 |
| Rule 8 | 2 | False | 0 |
| Rule 9 | 1 | False | 0 |
| Rule 10 | 1 | False | 0 |
| Sum | 14 | n/a | 8 |

Applying Equation 1 to the data from Table 1 yields a salience score of 57% as shown below in Equation 2.

$$\text{Salience Score} = 8/14 = 57\% \quad \text{(Eq. 2)}$$

Figure 6:
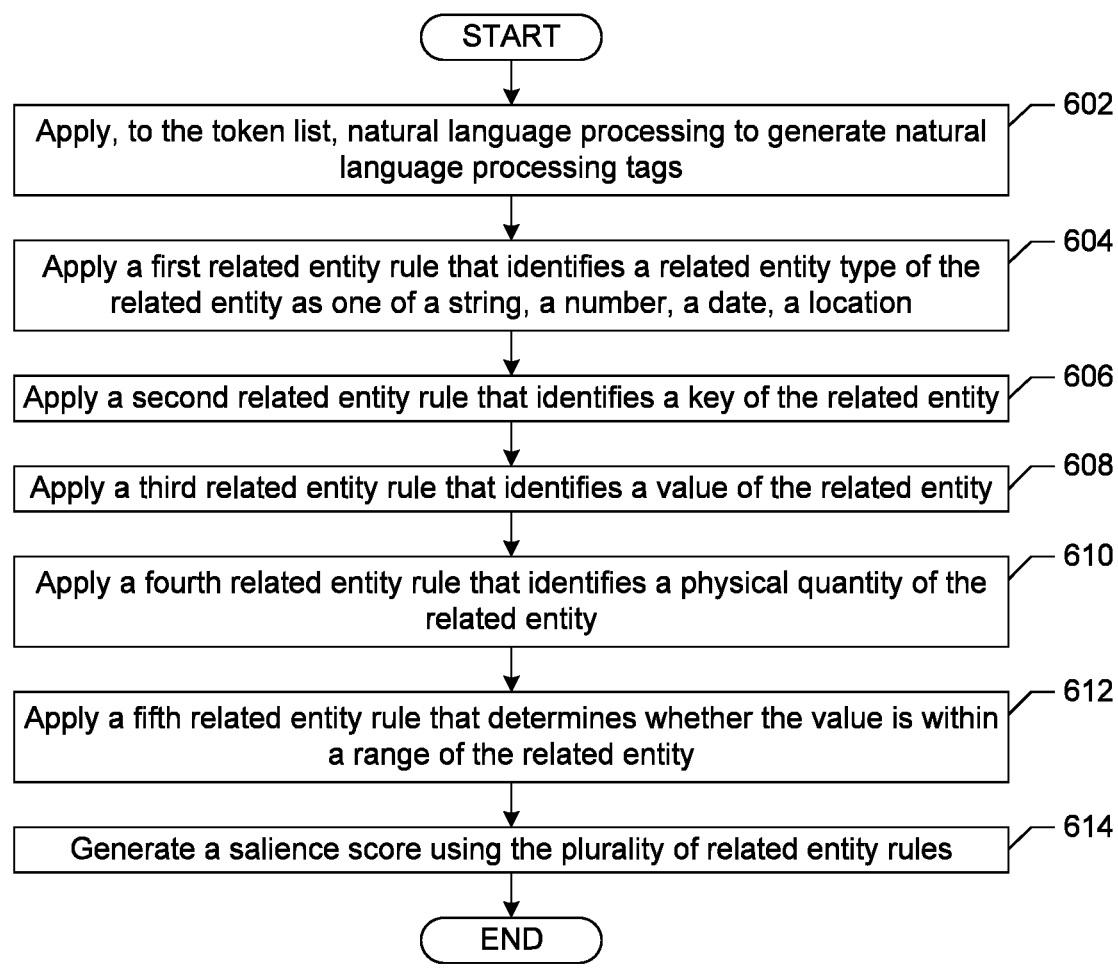

Turning to FIG. 6, FIG. 6 shows a flowchart in accordance with one or more embodiments of the disclosure. In one or more embodiments, the blocks of FIG. 6 can be performed as part of Block 306 of FIG. 3. In Block 602, natural language processing is applied. In one or more embodiments, the relationship analyzer applies the natural language processing to the token list generated from the text from the unstructured information. The natural language processing is applied by generating natural language processing tags that are associated with the tokens of the token list. In one or more embodiments, natural language processing includes part of speech analysis, coreference resolution, and dependency analysis.

The part of speech analysis identifies the part of speech (noun, verb, adjective, adverb, etc.) of the tokens in the token list. The tokens can be tagged with natural language processing tags that identify the part of speech of the tokens. For example, the token with the word "well" can be tagged with the natural language processing tag "NN" that identifies the token as being a noun.

The coreference resolution identifies tokens that refer to the same object, such as a pronoun that refers back to another noun in the text. In one or more embodiments, natural language processing tags are added to the tokens to identify the coreference resolution. For example, the text "Frigg formation is encountered in the well. Its average porosity is around . . . " is tokenized to a token list that includes tokens for the words "Frigg" and "well". A natural language processing tag is added to the token "Frigg" to identify the token "Frigg" as being referred to by the token "Its". A natural language processing tag is added to the token "Its" to identify the token "Its" as referring to the token "Frigg".

The dependency analysis parses the tokens to identify the grammatical meaning and relationships between the tokens, such as objects, predicates, prepositional phrases, modifiers, etc. In one or more embodiments, the relationship analyzer service generates a parse tree that identifies the grammatical relationships between the tokens in the token list from the text as links between the tokens. The parse tree links can be added as natural language processing tags to the tokens of the token list. For example, the text "Gas shows were encountered in the lair, it indicated very good permeability" includes the word "permeability". The word "permeability" is a noun that is a direct object of the verb "indicated" and is modified by the adjective "good". Natural language processing tags are added to the token for the word "permeability" to identify that the token "permeability" is a noun, is a direct object of the token "indicated", and is being modified by the token "good".

In Block 604, a first related entity rule is applied. In one or more embodiments, the first related entity rule is applied by the analyzer service to the token list. the first related entity rule identifies the related entity type of the related entity as one of a string, number, date, a location, etc. In one or more embodiments, the first rule compares the type of the token to the allowable type for the rule. As an example, a token can include the string of characters "ABCD" that is a string of characters and is not a number, date, or location, such that a related entity rule that matches to strings will return true and the related entity rules that match for numbers, dates, and locations will return false. As another example, a token can include the string of characters "7,486", which matches to the related entity rule for a number, and is a mismatch to the related entity rules for dates and locations. The related entity rules can use additional logic, such as regular expressions, to match the tokens of the token list to the type required by a related entity rule. A regular expression is a sequence of characters that defines a search pattern using a defined syntax, including Portable Operating System Interface (POSIX) syntax, Perl compatible regular expression (PCRE) syntax, etc. The regular expression for the related entity rule is applied to the token to determine if the token is of the type required by the related entity rule.

In Block 606, a second related entity rule is applied. In one or more embodiments, the second related entity rule is applied by the analyzer service to the tokens of the token list. The second related entity rule identifies a key of the related entity. The key of the related entity identifies and describes the value of a related entity with a name. As an example, a related entity that is the depth of a formation of a well can have the key "Depth". The second related entity rule can use a list of dictionary words that identify the name of the key for the related entity. When a token being analyzed includes the string "depth", the second related entity rule for the depth of the formation matches to the token to identify the key of the token as being "Depth".

In Block 608, a third related entity rule is applied. In one or more embodiments, the third related entity rule is applied by the entity analyzer service to identify the value of the related entity. The value can be identified by matching tokens to dictionary words and to regular expressions. For example, when the related entity is a color, the value identifies the color using strings, e.g., "grey", "white", "brown", etc. For another example, when the related entity is a depth, the value is a number (e.g., 7,468) that is matched to a regular expression, e.g. "^(\d+|\d{1,3}(,\d{3})*)$", and can be stored as an integer, floating point value, or string.

In Block 610, a fourth related entity rule is applied. In one or more embodiments, the fourth related entity rule is applied by the entity analyzer service to identify the physical quantity of the related entity. The physical quantity of the related entity is identified by matching tokens from the token list to dictionary words related to the physical quantity. As an example, when the physical quantity is feet, dictionary words that match can include "feet", "ft.", "ft", etc.

In Block 612, a fifth related entity rule is applied. In one or more embodiments, the fifth related entity rule is applied by the analyzer service to determine whether the value of the related entity is within a range of the related entity. The determination is made by comparing the value within a token to thresholds of the related entity. A related entity can include a minimum threshold and a maximum threshold that a value must be between in order to match with the related entity. For example, the related entity can be the depth of a formation that occurs below a minimum threshold of 5,000 feet and above a maximum threshold of 10,000 feet. When the value from a token is between these thresholds, then the rule matches the token to the related entity. Otherwise, the token does not match and is a mismatch.

In Block 614, a salience score is generated. In one or more embodiments, the analyzer service generates the salience score using the plurality of related entity rules. The salience score for the related entity is generated in a similar fashion as the salience score for a parent entity, which is described above with regard to Block 510 of FIG. 5. A numerator is generated that adds the related entity weights for the past related entity rules and the numerator is divided by a denominator that is generated by summing the related entity weights.

The following examples are for explanatory purposes only and are not intended to limit the scope of the disclosed embodiments. Turning to FIGS. 7.1 and 7.2, unstructured information that includes the text (702) is converted into structured information in the form of table (750). The text (702) of the unstructured information is tokenized to generate a token list that includes the tokens (704), (706), (708), (710), (712), (714), and (716). A parent entity of the text (702) is identified as a well, from the token (704), with the name "ABCD" from the token (706). A first related entity of the text (702) is identified from the token (708) as being a formation. The first related entity is identified as having the name "EFG" from the token (710). A second related entity is identified from the token (712) as being a depth. The depth is identified from the token (714) as having a value of 123 and the value is identified as being measured in feet from the token (716). The formation is a related entity of the well, and the depth is a related entity of the formation.

The information from the parent entity and the related entities is converted to the table (750) to form structured information. The table (750) includes the rows (752), (754), (756), and (758) and includes the columns (760) and (762). The parent entity and related entity information is converted into key-value pairs with the keys in the column (760) and the values in the column (762). The row (752) identifies the parent entity has a well with the name "ABCD". The row (754) identifies the first related entity as a formation with the name "EFG". The row (756) identifies the depth of the formation as 123. The row (758) identifies the units of the depth as being measured in feet.

Referring to FIGS. 8.1 and 8.2, unstructured information that includes the text (801) of FIG. 8.1 is converted into the table (852) of FIG. 8.2 to form structured information. Turning to FIG. 8.1, the text (801) of the unstructured information is tokenized to generate a token list that includes the tokens (802) through (829). Three parent entities in the text (801) are identified as formations and are converted to the records of the rows (858), (860), and (862) of the table (852) as structured information.

The first parent entity is the Basalanhydrit formation identified by the tokens (802) and (803) with a salience score of 0.67. The depth of the Basalanhydrit formation is identified as having a value of 7,486 from the token (804) and is measured in feet as identified from the token (805) with a salience score of 0.75. The color of the Basalanhydrit formation is identified as white from the tokens (809) and (811) with a salience score of 0.8. The rock type of the Basalanhydrit formation is identified as halite, polyhalite, and anhydrite from the tokens (806), (808), and (810) with a salience score of 0.8.

The second parent entity is the Hauptdolomit formation identified by the tokens (812) and (813) with a salience score of 0.67. The depth of the Hauptdolomit formation is identified as having a value of 7,638 from the token (814) and is measured in feet as identified from the token (815) with a salience score of 0.75. The color of the Hauptdolomit formation is identified as grey and brown from the tokens (819), (820), and (817) with a salience score of 0.8. The rock type of the Hauptdolomit formation is identified as limestone and dolomite from the tokens (818) and (816) with a salience score of 0.8.

The third parent entity is the Werraanhydrit formation identified by the tokens (821) and (822) with a salience score of 0.67. The depth of the Werraanhydrit formation is identified as having a value of 7,777 from the token (823) and is measured in feet as identified from the token (824) with a salience score of 0.75. The color of the Werraanhydrit formation is identified as white, grey, and brown from the tokens (826), (828), and (829) with a salience score of 0.8. The rock type of the Werraanhydrit formation is identified as limestone and anhydrite from the tokens (827) and (825) with a salience score of 0.8.

Turning to FIG. 8.2, the table (852) includes the rows (854) through (862) and the columns (864) through (880). The row (854) is a header row of the table and identifies the table as including records of formations and is named "Formation Header". The row (856) is another header row of the table that identifies the names of the columns (864) through (880) of the table. The rows (858), (860), and (862) are records of three parent entities identified from the text (801). The column (864) identifies the name of a formation and the column (866) identifies the salience score for the name of the formation. The column (868) identifies a value for the depth of the formation, the column (870) indicates the measurement units for the depth, and the column (872) provides the salience score for the depth of the formation. The column (874) identifies the colors of the formation and the column (876) identifies the salience score for the colors. The column (878) identifies the rock type for the formations and the column (880) identifies the salience score for the rock type for the formations.

Embodiments may be implemented on a computing system. Any combination of mobile, desktop, server, router, switch, embedded device, or other types of hardware may be used. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (900) in FIG. 9.1 may be connected to or be a part of a network. For example, as shown in FIG. 9.2, the network (920) may include multiple nodes (e.g., node X (922), node Y (924)). Nodes may correspond to a computing system, such as the computing system shown in FIG. 9.1, or a group of nodes combined may correspond to the computing system shown in FIG. 9.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform at least a portion of one or more embodiments of the disclosure.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9.1 and the nodes and/or client device in FIG. 9.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
    tokenizing text in unstructured information to generate a token list;
    applying, to the token list, a plurality of domain entity rules to identify a selected domain for the text, wherein the selected domain corresponds to a physical object mentioned in the unstructured information;
    applying, to the token list, a plurality of parent entity rules defined for the selected domain to identify a parent entity from a plurality of parent entities, wherein the plurality of parent entities identify a plurality of specific instances of the physical object;
    applying, to the token list, a plurality of related entity rules that are defined for a related entity linked to an identified instance of the plurality of specific instances identified by the parent entity, wherein the plurality of related entity rules identify at least one of an attribute, a property, or a characteristic of a specific instance of the plurality of specific instances of the physical object;
    adding the related entity as an extracted fact of the parent entity to a fact list; and
    transmitting the extracted fact as structured information to a repository.

2. The method of claim 1, wherein the unstructured information includes at least one of a report, a log-scan, or an image from an oilfield.

3. The method of claim 2, further comprising:
    obtaining the text from the at least one report, log-scan, or image from an oilfield by using an optical character recognition service that generates the text from the at least one of the report, the log-scan, or the image.

4. The method of claim 1, wherein the extracted fact includes a key that identifies a name of the extracted fact, and wherein the extracted fact includes a value.

5. The method of claim 4, further comprising:
    transmitting the extracted fact to a client device, wherein the client device displays the value of the extracted fact.

6. The method of claim 1, wherein applying the plurality of parent entity rules comprises:
    applying a first parent entity rule that includes a list of hit words that directly identify the parent entity and is associated with a first parent entity weight.

7. The method of claim 6, wherein applying the plurality of parent entity rules comprises:
    applying a second parent entity rule that includes a trigger list of tokens that are related to the parent entity and is associated with a second parent entity weight.

8. The method of claim 7, wherein applying the plurality of parent entity rules comprises:
    applying a third parent entity rule that includes a dictionary list of tokens that are proper names of parent entities and is associated with a third parent entity weight.

9. The method of claim 8, wherein applying the plurality of parent entity rules comprises:
    generating a parent entity salience score by generating a numerator, wherein generating the numerator comprises:
        adding the first parent entity weight when the first parent entity rule is passed;
        adding the second parent entity weight when the second parent entity rule is passed; and
        adding the third parent entity weight when the third parent entity rule is passed; and
    dividing the numerator by a denominator generated by summing the first parent entity weight, the second parent entity weight, and the third parent entity weight; and
    identifying the parent entity using the parent entity salience score.

10. The method of claim 1, wherein applying the plurality of related entity rules comprises:
    applying a first related entity rule that identifies a related entity type of the related entity as one of a string, a number, a date, or a location.

11. The method of claim 10, wherein applying the plurality of related entity rules comprises:
    applying a second related entity rule that identifies a key of the related entity;
    applying a third related entity rule that identifies a value of the related entity;
    applying a fourth related entity rule that identifies a physical quantity of the related entity; and
    applying a fifth related entity rule that determines whether the value is within a range of the related entity.

12. The method of claim 11, wherein applying the plurality of related entity rules comprises:
    generating a related entity salience score from applying the first related entity rule, the second related entity rule, the third related entity rule, and the fourth related entity rule.

13. The method of claim 1, wherein applying the plurality of related entity rules comprises:
    applying natural language processing to the token list to generate natural language processing tags that are associated with the token list.

14. A system comprising:
    a memory coupled to a processor; and
    an analyzer service that executes on the processor, uses the memory, and is configured for:
        tokenizing text in unstructured information to generate a token list;
        applying, to the token list, a plurality of domain entity rules to identify a selected domain for the text, wherein the selected domain corresponds to a physical object mentioned in the unstructured information;
        applying, to the token list, a plurality of parent entity rules defined for the selected domain to identify a parent entity from a plurality of parent entities, wherein the plurality of parent entities identify a plurality of specific instances of the physical object;
        applying, to the token list, a plurality of related entity rules that are defined for a related entity linked to an identified instance of the plurality of specific instances identified by the parent entity, wherein the plurality of related entity rules identify at least one of an attribute, a property, or a characteristic of a specific instance of the plurality of specific instances of the physical object;
        adding the related entity as an extracted fact of the parent entity to a fact list; and
        transmitting the extracted fact as structured information to a repository.

15. The system of claim 14, wherein the unstructured information includes at least one of a report, a log-scan, or an image from an oilfield.

16. The system of claim 14, wherein the analyzer service is further configured for:

obtaining the text from the at least one report, log-scan, or image from an oilfield by using an optical character recognition service that generates the text from the at least one of the report, the log-scan, or the image.

17. The system of claim 14, wherein the extracted fact includes a key that identifies a name of the extracted fact, and wherein the extracted fact includes a value.

18. The system of claim 14, wherein the analyzer service is further configured for:
    transmitting the extracted fact to a client device, wherein the client device displays the value of the extracted fact.

19. The system of claim 14, wherein applying the plurality of related entity rules comprises:
    applying natural language processing to the token list to generate natural language processing tags that are associated with the token list.

20. A computer program product comprising computer readable program code for causing a computer system to perform a method, the method comprising:
    tokenizing text in unstructured information to generate a token list;
    applying, to the token list, a plurality of domain entity rules to identify a selected domain for the text, wherein the selected domain corresponds to a physical object mentioned in the unstructured information;
    applying, to the token list, a plurality of parent entity rules defined for the selected domain to identify a parent entity from a plurality of parent entities, wherein the plurality of parent entities identify a plurality of specific instances of the physical object;
    applying, to the token list, a plurality of related entity rules that are defined for a related entity linked to an identified instance of the plurality of specific instances identified by the parent entity, wherein the plurality of related entity rules identify at least one of an attribute, a property, or a characteristic of a specific instance of the plurality of specific instances of the physical object;
    adding the related entity as an extracted fact of the parent entity to a fact list; and
    transmitting the extracted fact as structured information to a repository.

\* \* \* \* \*